United States Patent [19]

Vitt

[11] 4,140,412

[45] Feb. 20, 1979

[54] METHOD OF COVERING A JOINT OF TWO ROPE ENDS

[76] Inventor: Louis O. Vitt, 12319 Matthew La., St. Louis, Mo. 63127

[21] Appl. No.: 813,276

[22] Filed: Jul. 6, 1977

[51] Int. Cl.² .......................... F16B 4/00; F16G 11/00; B23P 11/02; B65H 69/04; D04G 5/00; F16L 11/12

[52] U.S. Cl. ........................................ 403/28; 28/209; 28/211; 24/115 A; 24/128; 24/129 D; 29/447; 29/526 R; 174/DIG. 8; 264/230; 289/1.2; 289/1.5; 289/18; 403/214; 403/273; 428/36; 428/913; 74/231 R

[58] Field of Search .................. 174/DIG. 8; 289/1.2, 289/1.5, 17, 18; 24/115 A, 128, 129 D; 403/28, 214, 273; 264/230; 29/447, 526 R; 28/209, 211; 74/231 R

[56] References Cited

U.S. PATENT DOCUMENTS

| 2,577,466 | 12/1951 | Jones | 174/DIG. 8 |
| 3,035,113 | 5/1962 | Danchuk | 174/DIG. 8 |
| 3,834,008 | 9/1974 | Witt et al. | 403/273 |
| 3,952,376 | 4/1976 | Ellis | 24/115 A |

Primary Examiner—William R. Dixon, Jr.

[57] ABSTRACT

This method of covering a joint of two rope ends includes use of a joint cover constructed of plastic tubing, included heat shrinkable plastic tubing, with methods to form a conical wedge shaped cover. The joint cover functions to help provide a smooth movement of the joint around obstacles. Also included is the use of "selected area shrinkage."

1 Claim, 11 Drawing Figures

METHOD OF COVERING A JOINT OF TWO ROPE ENDS

BACKGROUND OF THE INVENTION

A method for joining the ends of rope (strands, wire, cable, etc.) is necessary in mechanical operations, including lifting, towing, or the like. The rope ends being joined can be either of different pieces of rope (in order to make a longer length rope), or the ends can be of the same piece of rope (to form a continuous or "endless" loop).

An example of this latter use is the well-known commercial "rope-tow" system used to pull skiers up hills. The ends of the rope are usually joined by a "splice," (defined as a joint accomplished by "weaving" the ends of the rope together).

The "splice" is an ideal method for this commercial application, where a relatively large rope diameter (½" to ¾" approx.) is used in a permanent and high cost installation, where there is little likelihood of having to re-splice the rope. The "splice" method has the advantage of being practically the same diameter and strength as the parent rope. However, the "splice" method has the disadvantage of being difficult to make, and does not lend itself to being done by an inexperienced person, and the method is very time consuming.

In towing operations using smaller diameter rope (for lighter loads), the splice is not too desirable to use. These applications might include use for:

1. Cross-country skiing, where rope sizes might be ⅛" to ¼" diameter (approx.). Here, light weight rope is desirable, as the rope might be carried to the tow site by a skier; the rope might be left inattended for some periods of time, (making it desirable to use a rope of low dollar value), or the rope may be moved to another slope, requiring a probable change in overall length.

2. Marginal snow areas, which might not justify the high cost of a permanent type installation.

3. Beginner's practice tow for low cost and "backyard" applications, etc.

Some other methods of joining ropes (strands, wire, cable, etc.), besides the splice, include:

1. Use of an auxiliary piece, (tubing, clamp, or the like). However, it is difficult to find a product which gives a joint which has the strength approaching the strength of the rope, while still being sufficiently flexible to bend when going around the support and drive pulleys, and at the same time be relatively smooth, and without any objectionable protrusions, which increase chances of entanglement, etc.

2. Use of a bare knot. This method has the disadvantage of having an abrupt change in diameter, which increases chances of entanglement, etc.

3. Use of a knot and a knot cover. This cover can smooth out the abrupt change in the diameter of the rope section caused by the knot. The cover can have the shape of a conical wedge or ramp. The cover can be either a "double ended" wedge (for movement in either direction) or a "single ended" wedge (for movement in one direction only). More details are provided below.

This method of the knot cover relates to the present invention, and wherein an improvement to the generally available method of using a bare (uncovered) knot, said improvement comprising the addition of a joint cover means to accomplish the desired result.

Optional methods available for forming a joint cover means to smooth out abrupt changes in diameter include:

A. Use of sleeving, in forms as follows:
1. Uniform diameter, with methods to form the necessary wedge shape. (This method relates to the present invention.)
2. Non-uniform diameter. Problems: high cost and difficult to obtain.

B. Wrap knot area with "tape" type material to form a cover. Problems: probably low flexibility and low endurance.

C. Wrap knot area with "thread" type material to form a cover.
Problems: (same as B.)

D. Cover knot area with a "castable resin" type material.
Problems: It is difficult to obtain a suitable castable resin which would be flexible enough for bending, and still have a wear resistant and "low-friction" surface, and it would probably require time for hardening.

4. Use of a method to form the ends of the strands into "hook" shapes which are then interlocked, and the joint is then covered in some method to resist separation. It can be seen that the strength of this joint is dependent on the stiffness of the hook section to resist straightening.

This method relates to the "Prior Arts Patent" listed below. It can be seen that the present invention differs from the referenced "Prior Arts Patent" in factors including:

A. Difference in the flexibility of the strands being joined. As a rope of sufficient flexibility to be joined with a knot, would be too flexible to retain a hook shape necessary for a strong joint. Conversely, a strand of sufficient stiffness to retain a hook shape, would be too stiff to joined with a knot.

B. The present invention uses the sleeving to form a joint cover to smooth out abrupt changes in diameter (caused by the joint), for the purpose of reducing entanglement tendencies, etc., as with adjacent segments of the rope or mating parts of the system.

C. The present invention does not necessarily use the sleeving to prevent separation of the joint, which separation appears to be the purpose in the Prior Art reference.

D. The present invention uses heat shrinking only in selected areas of the cover, leaving part of the tubing unshrunk, (to provide increased flex life).

REFERENCE TO PRIOR ART PATENTS

Witt; U.S. Pat. No. 3,834,008 / Sept. 10, 1974.

This patent discloses a method of joining two wire cords (as used in automobile rubber tire construction). This wire cord (being stiff and not practical to knot) is joined by bending a hook in the end of each wire, then interlocking the hooks, and covering the joint with a piece of heat shrinkable tubing, which provides resistance to the hooks' separating.

SUMMARY OF THE INVENTION

The present invention contemplates a joint method suitable for ropes (or cables, wires, etc.) which are sufficiently flexible to be joined with a knot, and, conversely, are too flexible to hold together with a single bend, (as used in the "Prior Art Reference").

The joint is formed by knotting the ends of the ropes together, and covering the knot area with a length or lengths of plastic tubing to form a joint cover, which smoothes out abrupt changes in diameter, as caused by the knot, while still retaining a high degree of flexibility necessary for its use. This cover can take either of two general forms, (depending on the application), as follows:

1. Form of a SINGLE ended conical wedge, for use in applications where the intended direction of relative rope movement is always in one direction.

2. Form of a DOUBLE ended conical wedge, for use in applications where the intended direction of relative rope movement is in either direction.

An additional feature of the present invention relates to methods which use heat shrinkable tubing, and which includes shrinkage in selected areas only, which aids in forming the desired shape, and obtaining the desired flexibility.

It can be seen that the invention could be used with various types of rope applications wherever there is "relative" movement of the rope with reference to the mating parts of the system, including:

1. Moving rope (related to the ground), mating to a device which is being pulled by the rope, as with the ski-tow application.

2. Stationary rope (related to the ground), mating to a powered device moving along the rope, as with a self-propelled tow device where the skier holds onto a portable power unit, and is pulled along a stationary rope.

The objectives of the present invention (including applications to a ski-tow system) include:

1. Providing a joining method suitable for flexible ropes, wires or the like, plus a cover means over the joint area which provides a relatively smooth transition which, in turn, reduces any tendency for entanglement with adjacent sections of the rope or other components of the system.

2. Providing a joining method which retains a joint strength approaching the strength of the parent rope member.

3. Providing a cover with flexibility for:
   A. Long life expectancy
   B. Resisting stresses caused by bending, as the joint area travels around the rope support pulleys, drive pulleys, or system components (as ski-tow devices, etc.).

4. Providing a joining and covering method which can easily be done by an inexperienced person.

5. Providing a joining method suited to small diameter and light weight rope which does not lend itself to splicing.

6. Providing a cover means which uses components which are inexpensive and readily available.

7. Providing a method which does not require the use of special tools.

8. Providing a cover method which can be done rapidly, and without need to wait for drying, curing, etc.

Other objectives and a fuller understanding of the present invention may be had by referring to the following description and claims, taken in conjunction with the accompanying drawings.

DESCRIPTION OF THE PREFERRED EMBODIMENTS

Figure 1:
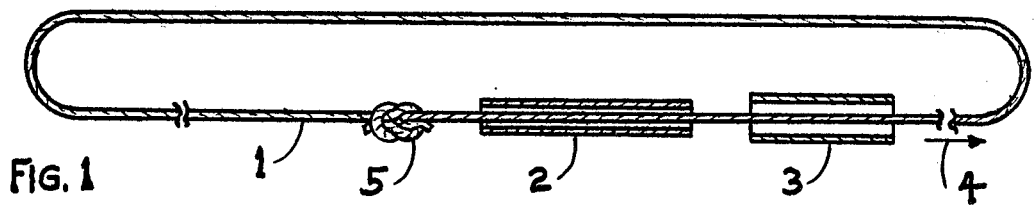
FIG. 1 is a side elevation view of the rope, knot and sectional view of the tubings at one step of the method.

Referring now to FIG. 1, the method of joining the end lengths of a rope 1 consists of inserting one end of the rope, (specifically the "leading" end, as described below) into two telescopable sections of heat shrinkable tubing, as the inner tube 2, and the outer tube 3.

The heat shrinkable tubing may be of the commercially available type, obtainable thru electronic equipment suppliers. The tubing is available in numerous diameters, lengths and wall thicknesses. The tubing shrinks to about one-half of its diameter (if not restrained by contact with the mating part), when subjected to heat of about 275° F. The basic raw material of heat shrinkable tubing being usually "Polyolefin."

The selection of the proper diameter and wall thickness is as follows: The inner tube 2 is selected with an inside diameter (unshrunk) slightly larger than the rope diameter (to allow easy assembly). (The inner tube functions to provide support for the outer tube, and the combination of tubes function to form the desired wedge shape.) The outer tube 3 is selected with an inside diameter (unshrunk) as a snug fit over the knot. (This fit can provide an additional function of providing some extra resistance to the knot loosening up, but this is of minor importance).

These sizes of tube diameters can have been determined by previous trials based on the size of the rope and the type of knot used.

The tubing wall thicknesses are selected to provide the necessary strength, flexibility for bending, and at the same time, to telescope easily in the unshrunk condition, and still be a tight fit with the rope after shrinking.

The lengths of the inner tube 2 and the outer tube 3 are not especially critical to the function of the method. An average application could use an inner tube about 5 times the knot length, and the outer tube about 4 times the knot length. These proportions, together with their staggered positions (as described below) will result in the generally conical wedge shaped joint cover as desired.

As an example of the approximate sizes usable in a typical application (as with a ski-tow rope):
Rope diameter — 0.070″
Knot diameter — (range) — 0.14 to 0.20
Knot length — ¼″
Inner Tube:
  Inside diameter — 0.104
  Outside diameter — 0.130
  Wall thickness — 0.013
  Length — 1″
Outer Tube:
  Inside diameter — 0.164
  Outside diameter — 0.190
  Wall thickness — 0.013
  Length — 1 ¼″

It can be seen that the optimum ratio of the "Tube Length" divided by the "Knot Length" relates to many variables in the design of the system, including:
1. Relative speed between components.
2. Tension on the rope, which influences the resultant forces (between components) to be overcome by the cover means.
3. Desired life expectancy of the cover.
4. Degree (or amount) of "obstruction" that the cover needs to overcome.

As a summary to the choice of the above ratio, it can be seen that the option relates to the "wedge" or "cam" angle needed between the center line of the rope and the various surfaces of the cover, in that a steeper angle exerts more "shock factor," whereas a more gradual angle allows smoother movement to overcome the obstruction.

In actual practice, a 45° angle is usually considered as "sever," whereas a 30° angle is more desirable. However, other factors relate to this angle, including the relative length and height of the angular section compared to the size of the part being contacted, as related to the step caused by the necessary wall thickness of the tubing.

A limiting factor for using a longer tube length relates to the diminishing effect of increased length vs. increased material cost.

It should be noted that, for this "one direction cover", the direction of movement of the assembled rope should be such that the plastic tubing would always be on the "leading end" of the joint area, and basically preceding the knot, to provide the increasing diameter conically shaped wedge action. This direction of rope movement 4, is indicated on the drawing.

It would be apparent that the direction of rope movement 4 would need to be determined before the assembly is begun, if the rope was already in its position of use. Conversely, the movement direction would be immaterial if the rope was not yet in its operating position. If that was the case, the tubing could be put on either side of the knot, but then the rope assembly would need to be oriented to move in the required direction when being placed in operating position.

The assembly method is continued by joining the ends of the rope with a knot 5, pulling the knot tight, and trimming the ends of the rope fairly close to the knot, (especially the end on the side of the knot containing the tubing, to allow a close fit with the inner tube 2, as described below).

It should be noted that the choice of the type of knot usable to obtain best results is open for experimentation, but it has been found that the "square knot" (as shown) has advantages including:
  1. Good resistance to slipping open.
  2. Small diameter.
  3. Short length.

It should be noted that an additional feature of the method can include the application of a fast-drying adhesive type cement to the ends of the rope at the knot area, before and/or after tying the knot, to provide an additional resistance to the knot loosening or slipping.

Figure 2:
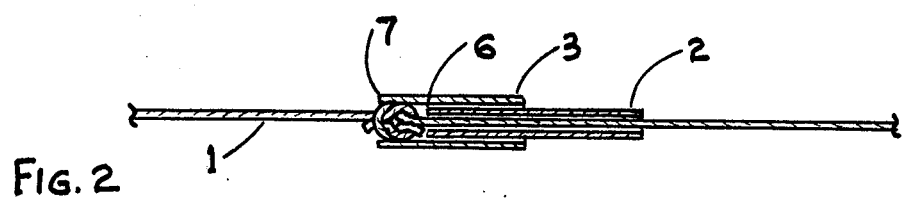
FIG. 2 is a side elevation fragmentary view of the rope, knot and sectional view of the tubings at another step of the method.

Referring now to FIG. 2, the assembly is continued as the inner tube 2 is positioned with its "trailing" end 6 adjacent (abutting) the "leading" side of the knot, and the outer tube 3 is positioned with its trailing end 7 near the trailing end of the knot. The exact location of the outer tube 3 is not especially critical to the function of the method. Good results are obtained if the trailing end is at least beyond the center of the knot (toward the trailing side), to provide the desired "wedge" effect, and, as the other limit, any excess length beyond the trailing end of the knot is of questionable value, and can actually have a detrimental effect on the life of the cover, by subjecting the cover to more stress, as the excess length would bend further when going around a pulley, and would also be in tighter contact with the rope. (It should be noted that the inner tube 2 covers the rope area defined as the "adjacent joint area".)

It can be seen that at this stage of the assembly, (before any heat shrinking is done to the tubing), that a certain degree of "generally conically wedge shaped" knot cover has been built up, so that the cover means would function to a certain degree, without the additional operation of heat shrinking. It then also follows that the basic method also works with regular (non heat shrinkable) tubing, but the resulting conical shape would not be as functional nor as snuggly fitting on the leading end as that obtained by the additional feature of heat shrinking, as described below.

Figure 3:
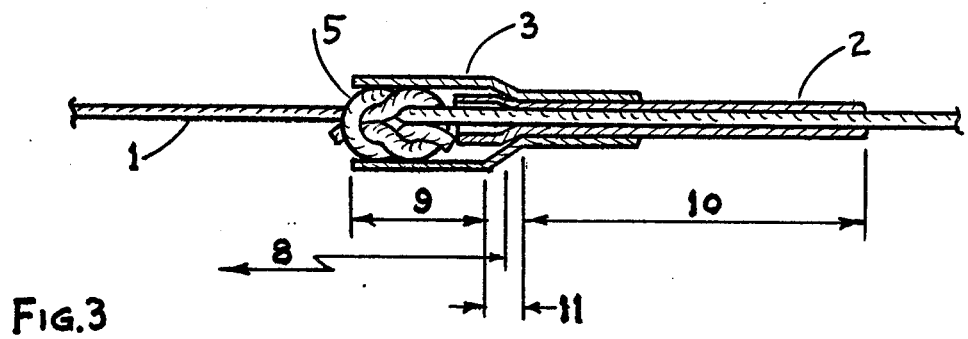
FIG. 3 is a side elevation fragmentary enlarged view of the rope, knot and sectional view of the tubings at the completion of the method.

Referring now to FIG. 3, the tubing is now heated, (as previously described), but only in a selected area, specifically the leading end. This "selected area shrinkage" is accomplished by heating only part of the lengths of tubing to the temperature necessary for full shrinkage, while the remainder of the tube lengths remain (basically) in the original unshrunk condition. Actually, there will be a "transitional" area between the fully shrunk and the unshrunk areas, which helps to form an additional "conical wedge" section as desired. The proportions of this transitional area are a function of many variables, including the amount of shielding, the heat variables (temperature, duration, direction, etc.), the tightness of the shielding wrap, and the like.

The said heating can be provided by various heat sources, including commercially available electric heating coils, electric hot air blowers, or even cigarette lighters (which are ideal for "field" use).

As an aid to controlling the location of the heat applied in the "selected area shrinkage" method, a heat shield means can be applied around the area to be protected from the heat. This heat shield can take various forms, including the use of the well known aluminum foil, (used in home baking processes), being wrapped around the tubing. The location of the heat shield is indicated on the drawing as area 8. The edge of the heat shield toward the leading side of the cover can be located at about the mid-point of the length of outer tube 3, and the location of the other edge of the heat shield is not critical, as long as it is somewhat beyond the trailing end of outer tube 3.

It can be understood that the shielding process results in basically three types of tubing shrinkage, as:
1. Unshrunk area 9.
2. Shrunk area 10.
3. Transitional area 11, composed of tubing of intermediate degrees of shrinkage, resulting in a conically shaped section between the shrunk and the unshrunk areas.

To summarize the above information, it can be understood that the aforementioned three types of tubing shrinkage are the result of the "selected area shrinkage" method, whereas the heat shield is an aid, but not an essential element, to producing the results. Also, the aforementioned "intermediate degrees of shrinkage" can be considered as partially shrunk tubing.

SUMMARY OF FEATURES

A. Use of heat shrinkable tubing allows use of diameters with sufficient clearances to freely telescope for easy assembly before shrinking.

B. The heat shrinking process accomplishments include:
1. A tighter fit and smoother surface due to less diameter differences (after shrinking) between the mating diameters of the rope, inner tube, and outer tube at the leading end of the cover assembly.
2. A reduced tendency for the tubes to slide longitudinally along the rope (due to the tighter fit)

C. Additional accomplishments of the "selected area shrinkage" include:
1. Additional amount of "conical shaping."
2. Improved "cycle life" of the cover by reducing the degree of high stress areas (in the knot area) that might be caused if the outer tube was shrunk tight around the knot.

Figures 4, 5:
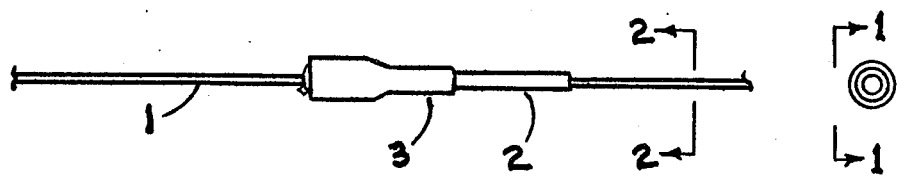
FIG. 4 is a side elevation fragmentary view of the rope, knot and tubings at the completion of the method taken along lines 1—1 of FIG. 5.
FIG. 5 is a front elevation view of the tubings and fragmentary sectional view of the rope at the completion of the method taken along lines 2—2 of FIG. 4.

Referring now to FIG. 4, this outside view shows the gradually increasing diameters and the improved smoothness of the joint as provided by the cover tubes after selective area heat shrinking.

Referring now to FIG. 5, this end view shows the circular shape of the inner and outer tubes.

Figure 6:
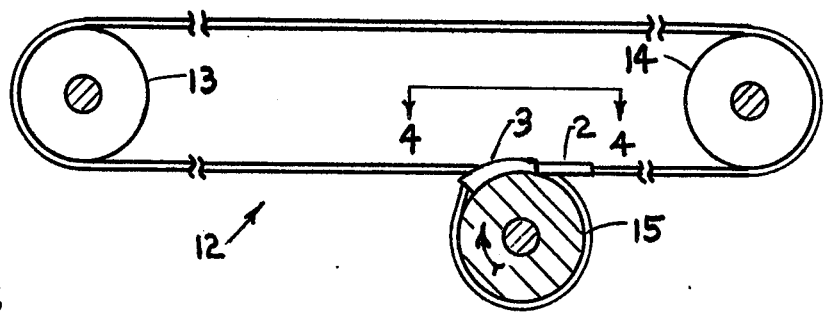
FIG. 6 is a side elevation reduced scale view showing the rope assembly in a relative position with mating components, and with a fragmentary sectional view taken along lines 3—3 of FIG. 7.

Referring now to FIG. 6, showing a schematic view of the rope assembly 12 (in an application such as a ski-tow) in position with the mating components, as end pulleys 13 and 14, and drive pulley 15. The knot cover is shown in the curved position, as when going around the drive pulley, (indicating the need for flexibility in the cover).

Figure 7:
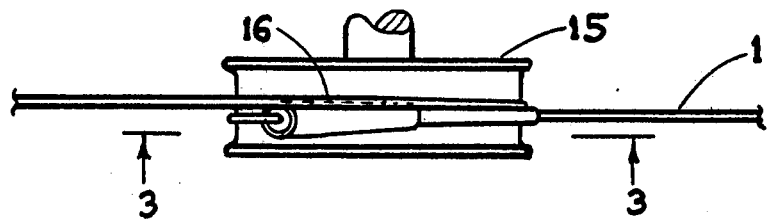
FIG. 7 is a top fragmentary view showing the rope assembly in a relative position with a mating component, taken along lines 4—4 of FIG. 6.

Referring now to FIG. 7, showing a top plan view of aforesaid drive pulley 15, with the rope wrapped one turn around the pulley (as sometimes necessary to obtain sufficient surface contact to obtain sufficient friction for pulling). Under these conditions, at the point of closest proximity, the ropes sometimes have a tendency to rub together, and any protrusion (such as a knot without a cover) may have a tendency to cause an entanglement of the rope and pulley. The present invention provides a solution to this problem. The knot cover is shown in the position of helping the knot to wedge its way past the adjacent section of rope at area 16.

Figure 8:
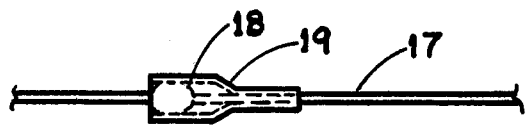
FIG. 8 is a side elevation fragmentary view of the rope, knot and tubing at the completion of a modified method.

Referring now to FIG. 8, showing a side elevation view of the rope 17, knot 18, and tubing 19 at the completion of a modified method. This method is similar to the previous (FIGS. 3 and 4) except eliminating the previously used inner tube. The tubing is shrunk at the outer end only, as before. The results of this method provide a more abrupt wedge shape, but a lower material cost.

Figure 9:
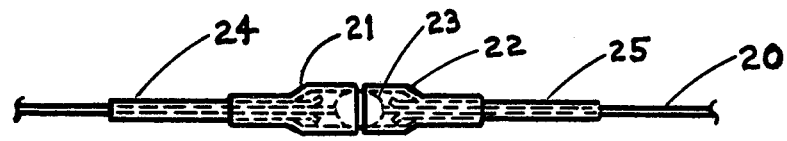
FIG. 9 is a side elevation fragmentary view of the rope, knot and tubing at the completion of another modified method.

Referring now to FIG. 9, showing a side elevation view of the rope 20 and tubings at the completion of another modified method. This method is similar to the previous method shown in FIGS. 3 and 4, except it uses two cover assemblies on the same knot to provide the double ended conical wedge effect for using the rope assembly in either direction of movement. Note the the ends of the outer tubes 21 and 22 practically butt together at the center of the knot 23. The inner tubes are shown as 24 and 25. The assembly is shrunk on the outer ends only.

Figure 10:
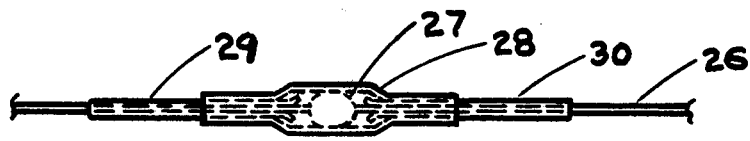
FIG. 10 is a side elevation fragmentary view of the rope, knot and tubing at the completion of another modified method.

Referring now to FIG. 10, showing a side elevation view of the rope 26, knot 27, and tubings at the completion of another modified method. This method is a variation of the previous method shown in FIG. 9, providing a "two directional" cover, but made with a one-piece outer tube 28 and two inner tubes 29 and 30. The assembly is shrunk on the outer ends only.

Figure 11:
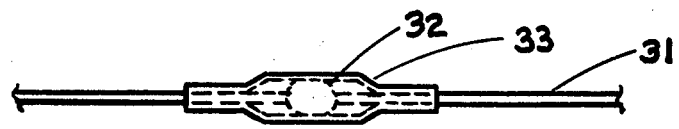
FIG. 11 is a side elevation fragmentary view of the rope, knot and tubing at the completion of another modified method.

Referring now to FIG. 11, showing a side elevation view of the rope 31, knot 32, and tubing 33 at the completion of another modified method. This method is a combination of previous methods shown on FIGS. 8 and 10, providing a "two directional" cover made with only one piece of tubing 33. The assembly is shrunk on the outer ends only.

The foregoing descriptions show the application of the joint cover methods for uses including towing and lifting operations which can utilize a means to reduce tendencies for entanglement as caused by use of an uncovered joint of the rope ends. The cover functions to smooth out and reduce the abruptness of the changes in diameter as caused by the joint.

I claim as my invention:
1. A cover means for enclosing a joint area of two rope ends to facilitate smoother movement around an obstacle than if the joint area was uncovered, said cover means being comprised of:
   (a) at least one cover sleeve of heat shrinkable tubing covering the joint and adjacent joint area, said tubing extending on at least one side of said joint, and
   (b) at least one smaller diameter support tube of heat shrinkable tubing covering said adjacent joint area, and telescoping within said cover tube, with the length of said support tube sufficiently long to extend beyond the outer end of said cover tube for the purpose of forming additional transitional conical wedge shape to facilitate smoother movement around said obstacle, and
   (c) said heat shrinkable tubing being fully shrunk only on the ends away from said joint, thereby reducing clearance between said rope and said tubings for the purpose of forming additional transitional conical wedge shape to facilitate smoother movement around said obstacle, and
   (d) said heat shrinkable tubing being partially shrunk in the area adjacent said joint, and unshrunk in the portion covering the actual joint, with the partially shrunk area being between the unshrunk and shrunk area, for the purpose of forming additional conical wedge shape to facilitate smoother movement around said obstacle, with the length relationships of the tubing sections being: for the unshrunk portion of the cover sleeve approximately twice the joint length; for the partially shunk area of the cover sleeve and support sleeve approximately one-half the joint length, and the fully shrunk portion being the remaining length of the tubing sections.

* * * * *